(12) United States Patent
Livshits et al.

(10) Patent No.: US 10,044,750 B2
(45) Date of Patent: Aug. 7, 2018

(54) CODE LABELING BASED ON TOKENIZED CODE SAMPLES

(71) Applicant: Microsoft Technology Licensing, LLC., Redmond, WA (US)

(72) Inventors: Benjamin Livshits, Kirkland, WA (US); Benjamin G. Zorn, Woodinville, WA (US); Benjamin Stock, Erlangen (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 14/599,394

(22) Filed: Jan. 16, 2015

(65) Prior Publication Data

US 2016/0212153 A1 Jul. 21, 2016

(51) Int. Cl.
*G06F 11/00* (2006.01)
*G06F 12/14* (2006.01)
(Continued)

(52) U.S. Cl.
CPC ...... *H04L 63/145* (2013.01); *G06F 17/30598* (2013.01); *G06F 21/56* (2013.01); *G06F 21/563* (2013.01); *G06F 2221/2125* (2013.01)

(58) Field of Classification Search
CPC ............ G06F 21/56–21/566; G06F 2221/2125
See application file for complete search history.

(56) References Cited

U.S. PATENT DOCUMENTS

| 7,398,553 B1 * | 7/2008 | Li | G06F 21/566 |
| | | | 713/189 |
| 7,707,634 B2 * | 4/2010 | Sandu | G06F 21/562 |
| | | | 726/22 |

(Continued)

FOREIGN PATENT DOCUMENTS

| CN | 101471818 B | 5/2011 |
| WO | 2013009713 A2 | 1/2013 |

(Continued)

OTHER PUBLICATIONS

"International Search Report and Written Opinion Issued in PCT Application No. PCT/US2015/067552", dated Apr. 7, 2016, 12 Pages.

(Continued)

*Primary Examiner* — Daniel B Potratz
(74) *Attorney, Agent, or Firm* — Drinker Biddle & Reath LLP (57) ABSTRACT

Disclosed herein are systems and methods for detecting script code malware and generating signatures. A plurality of script code samples are received and transformed into a plurality of tokenized samples. The tokenized samples are based on syntactical elements of the plurality of script code samples. One or more clusters of samples are determined based on similarities in different ones of the plurality of tokenized samples, and known malicious code having a threshold similarity to a representative sample of the cluster of samples is identified. Based on the identifying, the cluster of samples is identified as malicious. Based at least on respective ones of the plurality of tokenized samples associated with the cluster of samples, a generalized code signature usable to identify the script code samples in the cluster of samples is generated.

20 Claims, 5 Drawing Sheets

(51) Int. Cl.
  G06F 12/16    (2006.01)
  G08B 23/00    (2006.01)
  H04L 29/06    (2006.01)
  G06F 21/56    (2013.01)
  G06F 17/30    (2006.01)

(56) References Cited

U.S. PATENT DOCUMENTS

| | | | |
|---|---|---|---|
| 8,201,244 | B2 | 6/2012 | Sun et al. |
| 8,424,091 | B1* | 4/2013 | Su .......................... H04L 51/12 |
| | | | 713/187 |
| 8,429,746 | B2 | 4/2013 | Capalik |
| 8,464,345 | B2 | 6/2013 | Satish et al. |
| 8,474,044 | B2 | 6/2013 | Zawadowskiy et al. |
| 8,499,283 | B2 | 7/2013 | Mony |
| 8,561,193 | B1* | 10/2013 | Srivastava ............ G06F 21/563 |
| | | | 713/152 |
| 8,650,637 | B2 | 2/2014 | Beresnevichiene et al. |
| 8,694,977 | B2 | 4/2014 | Mangard et al. |
| 8,826,438 | B2 | 9/2014 | Perdisci et al. |
| 8,826,439 | B1 | 9/2014 | Hu et al. |
| 8,850,581 | B2 | 9/2014 | Wang et al. |
| 8,875,292 | B1 | 10/2014 | Bogorad et al. |
| 8,881,287 | B1 | 11/2014 | Griffin et al. |
| 9,684,705 | B1* | 6/2017 | Satish .............. G06F 17/30598 |
| 2007/0240217 | A1* | 10/2007 | Tuvell ..................... G06F 21/56 |
| | | | 726/24 |
| 2011/0047618 | A1 | 2/2011 | Evans et al. |
| 2011/0271341 | A1* | 11/2011 | Satish ................... G06F 21/552 |
| | | | 726/23 |
| 2012/0216280 | A1* | 8/2012 | Zorn ....................... G06N 7/005 |
| | | | 726/23 |
| 2015/0180883 | A1* | 6/2015 | Aktas ................... H04L 63/145 |
| | | | 726/23 |

FOREIGN PATENT DOCUMENTS

| | | |
|---|---|---|
| WO | 2014152469 A1 | 9/2014 |
| WO | 2014153760 A1 | 10/2014 |

OTHER PUBLICATIONS

Blanc, et al., "Characterizing Obfuscated JavaScript Using Abstract Syntax Trees: Experimenting with Malicious Scripts", 26th International Conference on Advanced Information Networking & Applications Workshops, Mar. 26, 2012, pp. 344-351.

Qwertyus, "Edit distance—Wikipedia, the free encyclopedia", Retrieved at <<https://en.wikipedia.org/wiki/Edit_distance>>, Oct. 23, 2014, 4 Pages.

Vatamanu, et al., "A practical approach on clustering malicious PDF documents", In the Proceedings of Journal in Computer Virology, Springer-Verlag, vol. 8, No. 4, Jun. 15, 2012, pp. 151-163.

West, et al., "Metadata-driven Threat Classification of Network Endpoints Appearing in Malware", In Proceedings of 11th Conference on Detection of Intrusions and Malware & Vulnerability Assessment, Jul. 10, 2014, 20 pages.

Sinema, Dan, "Automated Reverse Engineering of Malware to Develop Network Signatures to Match with Known Network Signatures", In Thesis of Master of Science in Computer Science, Dec. 4, 2014, 72 pages.

Zhuge, et al., "Studying Malicious Websites and the Underground Economy on the Chinese Web", In Proceedings of Managing Information Risk and the Economics of Security, Jun. 25, 2008, pp. 225-244.

Chiu, et al., "Evolution of the Nuclear Exploit Kit", Published on: Oct. 9, 2014, Available at: <<http://blogs.cisco.com/security/talos/evolution-nuclear-ek>>, 9 pages.

Min, et al., "A New Technique for Counteracting Web Browser Exploits", In Proceedings of 23rd Australian Software Engineering Conference, Apr. 7, 2014, pp. 132-141.

Allodi, et al., "MalwareLab: Experimentation with Cybercrime Attack Tools", In Proceedings of 6th Workshop on Cyber Security Experimentation and Test, Aug. 12, 2013, 8 pages.

Angluin, Dana, "Learning Regular Sets from Queries and Counterexamples", In Journal Information and Computation, vol. 75, Issue 2, Nov. 1987, pp. 87-106.

Bilge, et al., "Before We Knew It: An Empirical Study of Zero-Day Attacks in the Real World", In Proceedings of ACM Conference on Computer and Communications Security, Oct. 16, 2012, pp. 833-844.

Brumley, et al., "Towards Automatic Generation of Vulnerability-Based Signatures", In Proceedings of IEEE Symposium on Security and Privacy, May 2006, 15 pages.

Caballero, et al., "Measuring Pay-per-Install: The Commoditization of Malware Distribution", In Proceedings of the 20th USENIX Conference on Security, Aug. 2011, 16 pages.

Cova, et al., "Detection and Analysis of Drive-by-Download Attacks and Malicious JavaScript Code", In Proceedings of the 19th International Conference on World Wide Web, Apr. 26, 2010, pp. 281-290.

Curtsinger, et al., "Zozzle: Low-Overhead Mostly Static JavaScript Malware Detection", In Proceedings of the Usenix Security Symposium, Aug. 2011, 18 pages.

Demaio, et al., "PExy: The Other Side of Exploit Kits", In Proceedings of 11th International Conference DIMVA, Jul. 10, 2014, 20 pages.

Egele, et al., "Defending Browsers against Drive-by Downloads: Mitigating Heap-Spraying Code Injection Attacks", In Proceedings of the 6th International Conference on Detection of Intrusions and Malware, and Vulnerability Assessment, Jul. 9, 2009, 19 pages.

Eshete, et al., "WebWinnow: Leveraging Exploit Kit Workflows to Detect Malicious Urls", In Proceedings of the 4th ACM Conference on Data and Application Security and Privacy, Mar. 3, 2014, pp. 305-312.

Ester, et al., "A Density-Based Algorithm for Discovering Clusters in Large Spatial Databases with Noise", In Proceedings of 2nd International Conference on Knowledge Discovery and Data Mining, Aug. 1996, 6 pages.

Grier, et al., "Manufacturing Compromise: the Emergence of Exploit-as-a-Service", In Proceedings of the ACM Conference on Computer and Communications Security, Oct. 16, 2012, pp. 821-832.

Griffin, et al., "Automatic Generation of String Signatures for Malware Detection", In Proceedings of the 12th International Symposium on Recent Advances in Intrusion Detection, Oct. 1, 2009, 20 pages.

Guido, Dan, "A Case Study of Intelligence-Driven Defense", In Proceedings of IEEE Computer and Reliability Societies, Nov. 2011, 4 pages.

Jones, Jason, "State of Web Exploit Kits", In Proceedings of BlackHat, Jul. 2012, 9 pages.

Kapravelos, et al., "Revolver: An Automated Approach to the Detection of Evasiveweb-Based Malware", In Proceedings of the 22nd USENIX Conference on Security, Aug. 2013, 15 pages.

Kephart, et al., "Automatic Extraction of Computer Virus Signatures", In Proceedings of the 4th Virus Bulletin International Conference, Sep. 1994, 18 pages.

Kim, et al., "Autograph: Toward Automated, Distributed Worm Signature Detection", In Proceedings of the 13th Conference on USENIX Security Symposium, Aug. 9, 2004, 16 pages.

Kolbitsch, et al., "Rozzle: De-Cloaking Internet Malware", In Proceedings of IEEE Symposium on Security and Privacy, May 2012, 15 pages.

Kotov, et al., "Anatomy of Exploit Kits: Preliminary Analysis of Exploit Kits as Software Artefacts", In Proceedings of the 5th International Conference on Engineering Secure Software and Systems, Feb. 2013, 5 pages.

Kreibich, et al., "Honeycomb—Creating Intrusion Detection Signatures Using Honeypots", In Proceedings of Second Workshop on Hot Topics in Networks, Nov. 20, 2003, 6 pages.

Li, et al., "Hamsa: Fast Signature Generation for Zero-Day Polymorphic Worms with Provable Attack Resilience", In IEEE Symposium on Security and Privacy, May 21, 2006, 15 pages.

(56) References Cited

OTHER PUBLICATIONS

Lu, et al., "BLADE: An Attack-Agnostic Approach for Preventing Drive-by Malware Infections", In Proceedings of the 17th ACM Conference on Computer and Communications Security, Oct. 4, 2010, pp. 440-450.
Moshchuk, et al., "A Crawler-based Study of Spyware on the Web", In Proceedings of Network and Distributed System Security Symposium, Feb. 2006, 17 pages.
Nachenberg, Carey, "Computer Virus-Antivirus Coevolution", In Proceedings of Communications of the ACM, vol. 40, Issue 1, Jan. 1997, pp. 46-51.
Newsome, et al., "Polygraph: Automatically Generating Signatures for Polymorphic Worms", In IEEE Symposium on Security and Privacy, May 8, 2005, 16 pages.
Newsome, et al., "Dynamic Taint Analysis for Automatic Detection, Analysis, and Signature Generation of Exploits on Commodity Software", In Proceedings of the 12th Annual Network and Distributed System Security Symposium, Feb. 2005, 17 pages.
Payer, Mathias, "Embracing the New Threat: Towards Automatically, Self-Diversifying Malware", In Proceedings of Symposium on Security for Asia Network, Apr. 2, 2014, 5 pages.
Perdiscia, et al., "Behavioral Clustering of HTTP-based Malware and Signature Generation using Malicious Network Traces", In Proceedings of the 7th USENIX Conference on Networked Systems Design and Implementation, Apr. 2010, 14 pages.
Provos, et al., "All your iFRAMEs Point to Us", In Proceedings of the 17th Conference on Security Symposium, Jul. 2008, 15 pages.
Provos, et al., "The Ghost in the Browser Analysis of Web-Based Malware", In Proceedings of the First Conference on First Workshop on Hot Topics in Understanding Botnets, Apr. 2007, 9 pages.
Ratanaworabhan, et al., "NOZZLE: A Defense against Heap-Spraying Code Injection Attacks", In Proceedings of USENIX Security Symposium, Aug. 10, 2009, 18 pages.
Rieck, et al., "Cujo: Efficient Detection and Prevention of Drive-by-Download Attacks", In Proceedings of the 26th Annual Computer Security Applications Conference, Dec. 6, 2010, pp. 31-39.
Schleimer, et al., "Winnowing: Local Algorithms for Document Fingerprinting", In Proceedings of ACM SIGMOD International Conference on Management of Data, Jun. 9, 2003, pp. 76-85.
Seifert, et al., "Measurement Study on Malicious Web Servers in the .nz Domain", In Proceedings of Information Security and Privacy, Jan. 2009, 20 pages.
Singh, et al., "The EarlyBird System for Real-time Detection of Unknown Worms", In Technical Report—CS2003-0761, Aug. 2003, 6 pages.
Wang, et al., "Anomalous Payload-based Worm Detection and Signature Generation", In Proceedings of Recent Advances in Intrusion Detection, Jan. 2006, 20 pages.
Wang, et al., "Automated Web Patrol with Strider HoneyMonkeys: Finding Web Sites that Exploit Browser Vulnerabilities", In Proceedings of the Network and Distributed System Security Symposium, Feb. 2006, 15 pages.
The PCT Written Opinion of the International Preliminary Examining Authority for PCT application No. PCT/US2015/067552, 5 pages.
"International Preliminary Report on Patentability Issued in PCT Application No. PCT/US2015/067552", dated Feb. 20, 2017, 8 Pages.

\* cited by examiner

CODE LABELING BASED ON TOKENIZED CODE SAMPLES

BACKGROUND

JavaScript® code executes in a web browser or inside other applications to perform functions that provide for a more personalized and richer experience than a static web page or other static content could provide. JavaScript® code is usually benign and often useful for the end user. However, a common malware exploit scheme involves having an end user unknowingly download malicious JavaScript® code onto his or her computer. Malicious code may be programmed to identify vulnerabilities on the victim's computer, such as a "heap spraying" vulnerability, or programmed to trigger a vulnerability in the JavaScript® renderer, in order to enable an attacker to do various things that an end user does not agree to and would not typically desire. For example, malicious code may compromise data on the end user's machine or cause the end user's machine to join a "botnet," a group of computers that are at least partly under another person's control, often employed for nefarious purposes.

Traditionally, JavaScript® code samples were produced by the same person or persons that hoped to use them to compromise end user devices. Over time, however, the field has moved towards differentiation, with a small number of exploit kit providers providing exploit kits to their more numerous "customers" who use various means to trick end users into downloading the exploits onto their machines.

An exploit kit typically includes three basic components, an execution trigger, an unpacker, and a payload. The payload may include code that targets one or more Common Vulnerability and Exposures (CVEs) on the end user's machine. The payload is typically packed or obfuscated by the exploit kit provider in order to prevent easy identification of the JavaScript® code sample as malicious. The unpacker unpacks or de-obfuscates the payload.

The number of known vulnerabilities is relatively low, and thus the payload of exploit kits change relatively infrequently. Also, even where new CVEs are used, they are often simply appended to the existing payload code. However, an exploit kit provider can easily change relatively trivial aspects of the exploit kit, such as the unpacker code, thereby making existing anti-virus signatures that target previous versions of the exploit kit useless for identifying new versions. It may take several days to create an anti-virus signature for a new exploit kit, but mere minutes for the exploit kit provider to realize that the new signature is available and make a new version of the kit available. Anti-virus vendors and others that make it their business to protect users from malicious code are therefore in a constant arms race against the exploit kits providers.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

Embodiments of the present disclosure include automated malicious code identification and signature compilation for code written in a scripting language, such as JavaScript®. Embodiments produce tokenized samples from the code samples. The tokenized samples are generated based on syntactical elements of the code in the code samples. A cluster engine performs clustering on the tokenized samples to identify code samples that are syntactically similar. A representative code sample of each cluster is de-obfuscated and compared to known samples of malicious code to determine a similarity measure, such as by using winnowing or other technique. Where the representative code sample is matched within a threshold similarity to a known malicious code sample, the cluster that the representative code sample comes from is labeled as malicious. Next, the detection and signature generation system generates a generalized signature that matches the code samples in the malicious cluster.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Embodiments of the present disclosure include automated malicious code identification and signature compilation for code written in a scripting language, such as JavaScript®. An exploit kit makes it easier for malicious actors to evade detection due to the ease of making small changes to the exploit kits that enable the kits to evade anti-virus detection signatures. But exploit kits also include certain features that can be used to automate their identification. In particular, the underlying code (often obfuscated) does not change very frequently, and new exploits are discovered only rarely. And when new exploits are discovered, the code is often simply appended to existing code in the payload. Also, since there are a limited number of exploit kit providers providing the vast majority of exploit kits identified in the "wild," most of the exploit kits encountered in practice are likely to share many syntactical and other similarities with known samples of malicious code. This provides an opportunity to automate the identification of malicious code.

In embodiments, a detection and signature generation system receives code samples that are not known to be malicious. The detection and signature generation system creates tokenized samples from the code samples. The tokenized samples are generated based on syntactical elements of the code in the code samples. For example, Keywords, Identifier, Punctuation, and Strings in the code are identified and classified as such. The classifiers are the tokens, and the tokenized samples include sequences of the tokens for the code samples. The tokenization is performed on the code samples as they are received, and not on de-obfuscated or unpacked code samples (unless the code samples are not obfuscated to begin with).

A cluster engine performs clustering on the tokenized samples to identify code samples that are syntactically similar. The clustering may be performed using parallelization to improve speed. A representative code sample of each cluster is de-obfuscated and compared to known samples of malicious code to determine a similarity measure, such as by using winnowing or other technique. Where the representative code sample is matched within a threshold similarity to a known malicious code sample, the cluster that the representative code sample comes from is labeled as malicious. Next, the detection and signature generation system generates a generalized signature that matches the code samples in the malicious cluster. In embodiments, the generalized signature matches all of the code samples in the cluster labeled malicious, and the signature may include expressions that are usable to match the different characters found in the code samples.

The generalized signatures may be employed in various ways. They may be distributed to end user machines by an anti-virus distribution system. Also, the signatures may be used to detect websites that contain malicious code. For example, a search engine back-end process may use the signatures to detect web sites hosting compromised code and prevent such websites from being included in search results.

As used herein, a script code sample is a type of software that is written in a scripting program language, generally intended to be interpreted at run-time or compiled just-in-time at the point of execution. One example of a script code sample is a JavaScript® code sample that is executed within a browser or other application on an end user machine. However, embodiments are not limited to JavaScript® code samples, and embodiments of the present application may be employed to identify, and to generate signatures for, malicious script code samples that are not written in JavaScript® code.

Also, although embodiments are described herein as identifying "malicious" code, embodiments of the present disclosure are employable to classify any script code samples as being in a same class as known code samples, whether or not those known script code samples are malicious.

The devices, processes, and systems described herein can be implemented in a number of ways. Example implementations are provided below with reference to the following figures.

Example Environment

Figure 1:
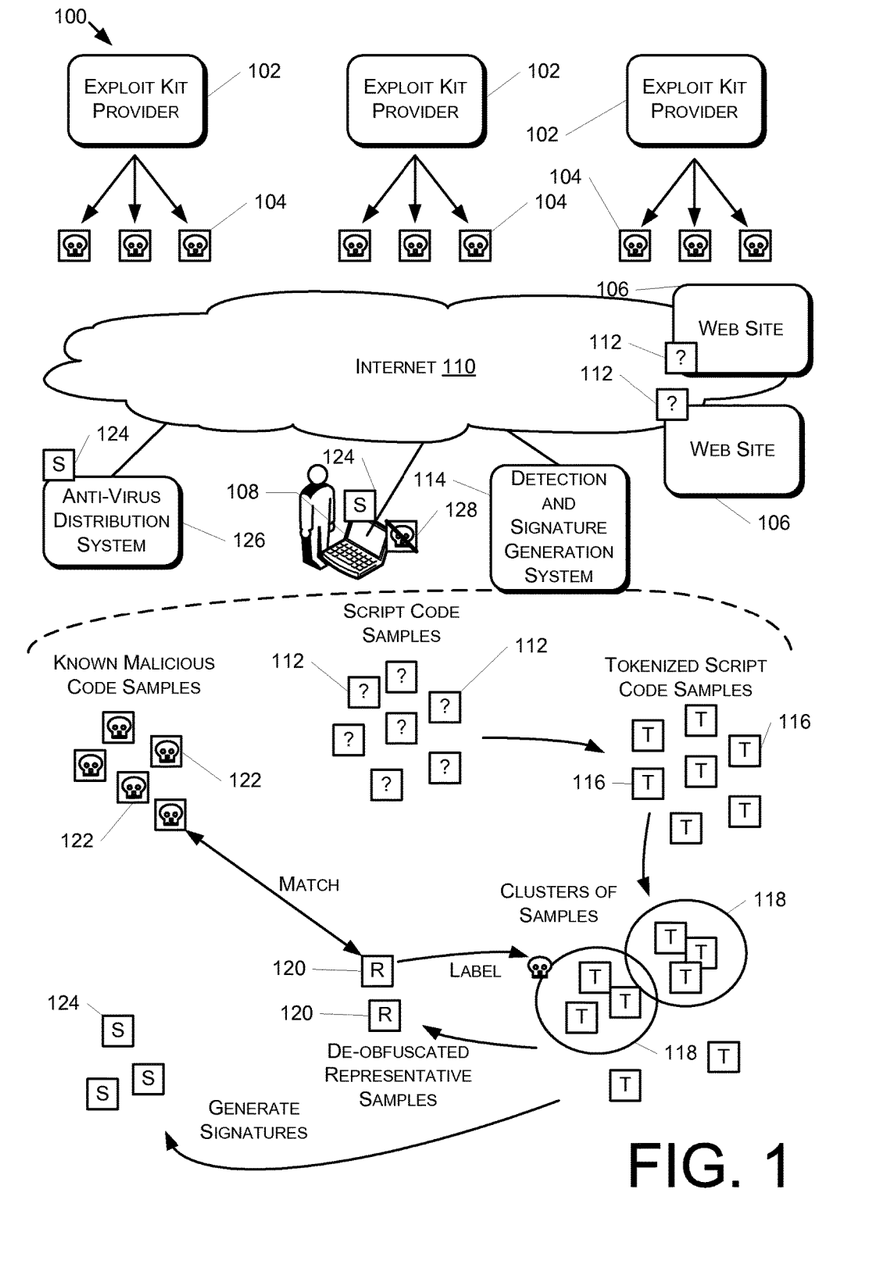
FIG. 1 illustrates an example environment for providing malicious code detection and signature generation.

FIG. 1 illustrates an example environment 100 for providing malicious code detection and signature generation. As noted above, various exploit kit providers 102 produce multiple versions of their exploit kits 104. The various exploit kits 104 made available by the exploit kit providers 102 may be released over time, with changes that are made responsive to anti-virus detection, with changes to add a new exploit, or changes made for other reasons. Websites 106—or other sources of content—are available to end user devices 108 via the Internet 110, or via some other network. The websites 106 provide static and dynamic content, including among other things script code samples 112. The status of script code samples 112 is initially unknown; in other words, it is not known whether one or more of the script code samples 112 are malicious code, such as one of the exploit kits 104, or benign script code.

A detection and signature generation system 114 receives the script code samples 112 that have been detected, such as by crawling the Internet 110, detection in end user browsers that have enabled data sharing (such as in an opt-in or opt-out fashion), or in some other way. Some of the script code samples 112 may be unknown script code samples never before detected, while some of the script code samples 112 may be known samples. In some embodiments, the known script code samples (e.g., those previously identified as benign or malicious) may be filtered out, while in some embodiments known script code samples may not be filtered out. The script code samples 112 are, in some embodiments, partitioned across a cluster of machines for clustering and labeling, as described elsewhere within this Detailed Description.

The script code samples are transformed into tokenized script samples 116. In some embodiments, elements of the concrete script code, such as JavaScript® code represented as Unicode are identified as being syntactical elements of the concrete script code. In the case of JavaScript® code, Keywords, Identifiers, Punctuation, and String syntactical elements are identified in the underlying code and token strings representing the script code created for each script code sample 112. An example tokenized sample might include token subsequence: Keyword-Identifier-Punctuation-Identifier-Punctuation-String-Punctuation-Punctuation-String-Punctuation, which corresponds to the original code sequence: 'var Euur1V=this ["19D"] ("cv#33339al").' The tokenization is performed on the code samples 112 in their obfuscated state, and not on de-obfuscated code samples. The tokenization process eliminates the artificial noise created by the exploit kit providers 102 by making otherwise trivial changes to the malicious code, such as in the form of randomized variable names, changes in obfuscation techniques, and so forth.

The detection and signature generation system 114 performs clustering of the tokenized samples using a hierarchical clustering algorithm. In some embodiments, an edit distance—or the number of operations it would take to change one string to another string—is used as a means of determining distance or similarity between any two code samples. In embodiments, a threshold edit distance of 0.1 may be sufficient to generate a reasonably small number of clusters while at the same time generating clusters that are sufficiently specific, and not likely to include code samples that are not malware. Other threshold edit distances may be used in embodiments. In one embodiment, a density-based algorithm is utilized to determine the clusters. The results of the clustering process are clusters 118, which are clustered based on their similarities. Some tokenized script code samples may not be clustered at all, based on their insufficient similarity to any other tokenized script code sample.

The detection and signature generation system 114 selects representative code samples 120 from each of the clusters of code samples. The representative code samples 120 may be selected as being the most similar to all other samples in a particular cluster, selected randomly, or selected using some other technique. The detection and signature generation system 114 de-obfuscates the representative code samples 120, either using unpacker code including for example custom de-obfuscation code, or using the unpacker components included in the script code samples 112 themselves. In embodiments, emulation of the code may be employed to unpack the code. In some embodiments, the unpacked payload of the exploit kit 104 is collected upon executing the exploit kit 104 in an execution engine.

The detection and signature generation system 114 determines whether the de-obfuscated representative code samples 120 match any known malicious code samples 122. In some embodiments, a document fingerprinting technique is used to determine whether the unknown samples share code with the known samples, even though the code may not be entirely the same, or even mostly the same. Sharing some of the same code as a known piece of malware identifies the sample as belonging to the same family. In embodiments, a winnowing technique is utilized for document fingerprinting. A winnow histogram for the representative code sample 120 is prepared and compared against winnow histograms for the known malicious code samples 122. If the similarity between the winnow histogram for one of the de-obfuscated representative code samples 120 and the winnow histogram for one of the known malicious code samples 122 is within a threshold, then the cluster 118 that the representative code sample 120 is taken from is considered matched to the known malicious code sample. Once a representative code sample 120 is matched to a known malicious code sample, the cluster 118 that it comes from is labeled or otherwise identified as malicious.

The detection and signature generation system 114 generates, for the clusters labeled or identified as malicious, a generalized signature 124 from the code of the corresponding script code samples 112. Signature generation will be described in more detail elsewhere within this Detailed Description. In some embodiments, the detection and signature generation system 114 provides the signatures 124 to an anti-virus distribution system 126. The anti-virus distribution system 126 provides the signatures 124 to anti-virus or other malware protection software on an end user device 108.

When a particular malicious code sample 128 is downloaded to the end user device 108, the anti-virus or other malware protection software on the end user device 108 utilizes the signature, such as in a conventional way, to detect the particular malicious code sample 128, which may enable the particular malicious code sample 128 to be contained, cleaned, prevented from being executed, or otherwise prevented from compromising the end user device 108.

Example Functions

The following pseudo-code illustrates the top-level process performed by the detection and signature generation system 114. The inputs to the process are unlabeled clusters, and the output are signatures for the malicious samples. The input samples are clustered into sets of clusters (e.g., clusters 118), a representative (i.e., "prototype") sample is selected from each cluster and attempted to be matched to known malicious code samples. The clusters 118 are labeled based on matching to known samples, and for those labeled as malicious, a new signature is generated for the cluster.

```
Main
Inputs: unlabeled samples
Returns: generated signatures for all malicious samples
1: clusters = Cluster(samples)
2: for all cluster in clusters do
3:   unpackedSample = Unpack(cluster.prototype)
4:   label = LabelSample(unpackedSample)
5:   if label != "unknown" then
6:     yield CreateSignature(cluster)
7:   end if
8: end for
```

The following Cluster pseudo-code provides an example clustering process. The process of clustering the input samples is computationally expensive. Some embodiments therefore employ parallelization across multiple computing devices. The unlabeled samples are partitioned and then tokenized as described elsewhere within this Detailed Description. The unlabeled tokenized samples are then clustered. DBSCAN is a type of density-based clustering algorithm. In a reduction phase (line 7), the clusters are determined by each partition, and then the clusters from each partition are combined in a final step.

```
Cluster
Inputs: unlabeled samples
Returns: clustered, unlabeled samples
1: partitions = Partition(samples)
2: for all partition in partitions do
3:   partitiontokens = map(partition, lambda x: tokenize(x))
4:   clusters[i] = DB SCAN(partitiontokens)
5:   i++
6: end for
7: return DB SCAN(clusters)
```

The following pseudo-code provides an example labeling process. Winnow histograms for the representative, de-obfuscated samples are determined. The overlap between the sample winnow histograms and the Winnow histograms for each known Malware Sample (kMS) is determined. Where the overlap is greater than a threshold, the sample is labeled as being in the kMS family. And the cluster from which the representative sample comes from is also labeled as being in the kMS family. Although the following pseudo-code determines winnow histograms for known Malware Samples, such histograms may be determined at a prior time and re-used for each labeling pass. kMS.threshold (i.e., the overlap threshold) is determined empirically in some embodiments.

```
LabelSample
Inputs: single unlabeled sample
Returns: label for that sample
1: global knownMalwareSamples
2: sampleWinnows = WinnowHistogram(sample)
3: for all kMS in knownMalwareSamples do
4:   kMSWinnows = WinnowHistogram(kMS.sample)
5:   overlap = HistogramOverlap(kMSWinnows, sampleWinnows)
6:   if overlap > kMS.threshold then
7:     return kMS.Family
8:   end if
9: end for
10: return "unknown"
```

Example Signature Generation Functions

Figure 2:
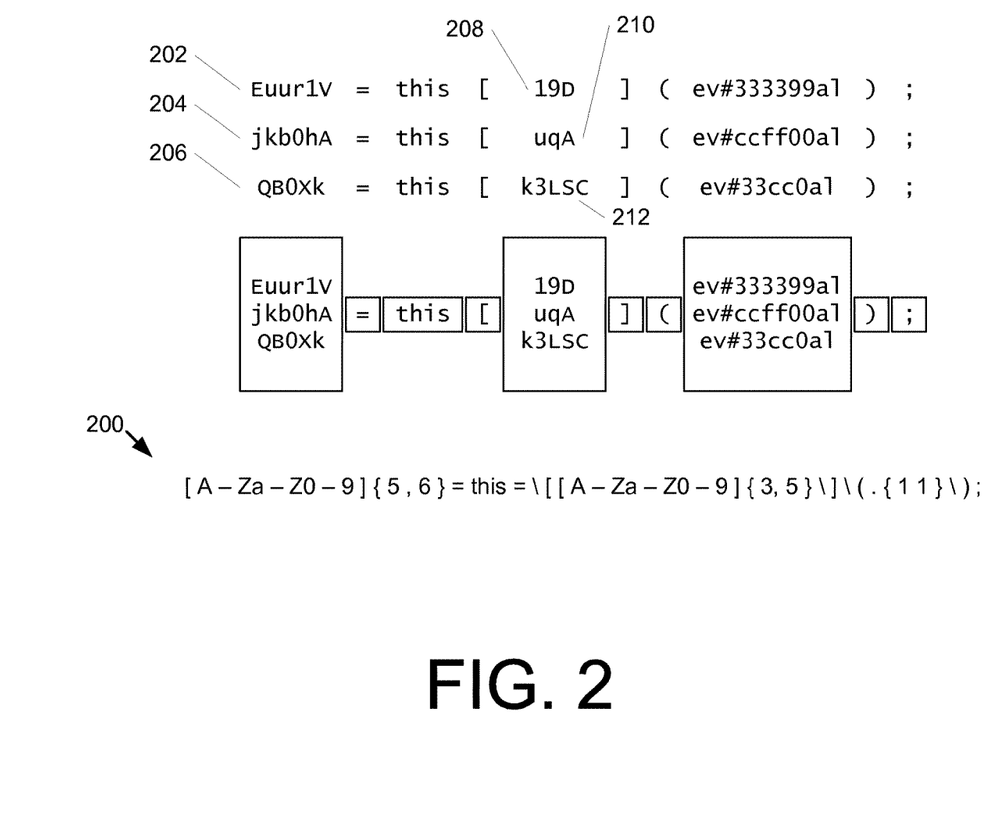
FIG. 2 illustrates an example signature expression that forms at least part of an automatically generated signature.

The following pseudo-code provides an example process for creating signatures. FIG. 2 illustrates an example signature expression 200 that forms at least part of an automatically generated signature, such as signatures 124. A detection and signature generation system, such as the detection and signature generation system 114, determines, for a cluster 118 that is labeled or identified as malicious, a common token subsequence shared by all tokenized script code samples 116 in the cluster 118. In embodiments, a value of N is determined such that every sample in the cluster 118 has a common token string subsequence of length up to N tokens. In embodiments, N may be capped, for example at 200 tokens or other token length. The subsequence is identified with a binary search. In the following pseudo-code, the function ExtractNgrams is called, pseudo-code for which is included below for the sake of completeness.

```
CreateSignature
Inputs: malicious cluster
Returns: signature to match all samples in the cluster
1: DistinctValues = [ ]
2: CommonSubseq = BinarySearch(extractNgrams, cluster, max=200)
3: if CommonSubseq.length < 20 then
4:   return <invalid>
5: end if
6: for all member in cluster do
7:   RelevantTokens = ExtractTokens(member, CommonSubseq)
8:   for all token in RelevantTokens do
9:     if token.value not in DistinctValuesthen
10:      DistinctValues[token.offset].add(token.value)
11:    end if
12:   end for
13: end for
14: signature = ""
15: for all values in DistinctValues do
16:   signature += GenerateMatchingRegexp(values)
17: end for
18: if signature.length < 100 then
19:   return <invalid>
20: end if
21: return signature
```

```
extractNgrams
Inputs: cluster, length of n-gram
Returns: distinct n-grams that can be found once if every
sample of the cluster
1: for all member in cluster do
2:   tokens = tokenize(member)
3:   tokenNgrams = getNgrams(tokens, n)
4:   NgramHistogram = histogram(tokenNgrams)
5:   UniqueNgrams = NgramHistogram.extract(count=1)
6:   for all ngram in UniqueNgrams do
7:     GlobalHistogram[ngram].count += 1
8:   end for
9: end for
10: for all ngram in GlobalHistogram do
11:   if ngram.count == size(cluster) then
12:     yield ngram
13:   end if
14: end for
```

The ExtractNgrams function determines if a common subsequence of length N exists in all of the samples. In embodiments, an additional constraint, that the subsequence be unique in every sample in the cluster is also imposed (line 5 of the ExtractNgrams function).

Once the length N of the common subsequence is known, and sufficiently long (subsequences with N that are below a certain threshold length—20 tokens in the example ExtractNgrams pseudo-code—are discarded), the sequence of tokens and characters from each of the samples in the cluster are extracted (line 4 in the CreateSignature pseudo-code). For each offset in the token sequence, the example algorithm determines the distinct set of concrete strings found in the different samples at the token offset.

The GenerateMatchingRegexp pseudo-code below provides an example process for generating a regular expression from the distinct set of values in the common subsequence. If a particular value is the same across all samples (line 1), then the concrete value is added to the signature. Otherwise, the algorithm generates a regular expression that matches all elements in the subsequences in all samples of the cluster. In some embodiments, a domain-specific approach is implemented that is based on expectations of the kinds of diversity that malware writers are likely to inject into their code.

This approach is highly scalable. The expressions computed accept strings of the observed lengths, and contain the characters observed by drawing on a predefined set of common patterns such as [a–z]+, [a–zA–Z0—9]+, etc. The example GenerateMatchingRegexp pseudo-code below uses brute force to determine a working pattern (line 9), but in other embodiments a more selective approach is utilized to build a more efficient decision procedure from the predefined templates.

```
GenerateMatchingRegexp
Inputs: distinct values
Returns: regular expression that matches all distinct values
1: if values.length == 1 then
2:   return values[0]
3: end if
4: minlength = min(values, key=length)
5: maxlength = max(values, key=length)
6: lengthdef = "" + minlength + "," + maxlength + ""
7: AllUsedChars = set(values.join( ).split( ))
8: PredefinedRegexp = (["^[A-Z-+]$", "^[A-Z0-9+]$", ...])
9: for all regexp in PredefinedRegexp do
10:   if regexp.matches(AllUsedChars) then
11:     return regexp + lengthdef
12:   end if
13: end for
14: return "." + lengthdef
```

FIG. 2 illustrates an example signature expression 200 that forms at least part of an automatically generated signature, such as signatures 124. Each element in the three subsequences 202-206 that is the same in all three subsequences is added to the signature. In the example shown in FIG. 2, the Identifier "this" and the punctuation is the same across all three subsequences 202-206. For those elements that are not the same in all three subsequences (such as elements 208-212), a regular expression is generated that matches all elements in all samples.

Example Processes

Figure 3:
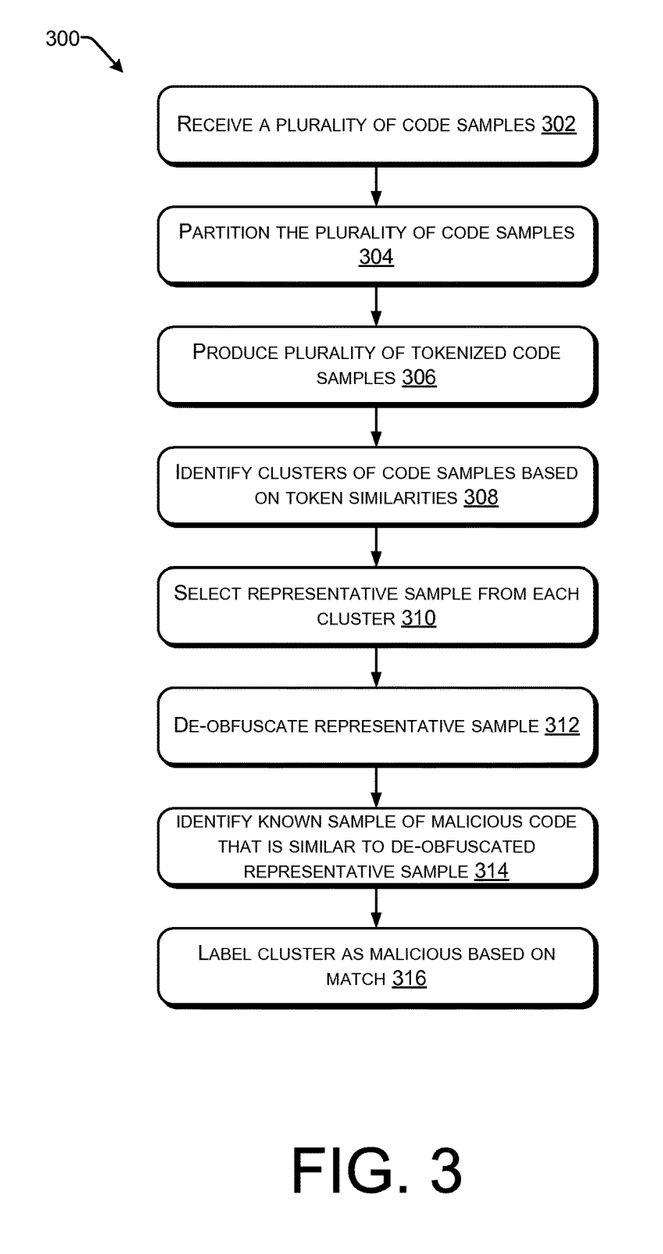
FIG. 3 depicts a flow diagram of an example process for automated identification of malicious code.

FIG. 3 depicts a flow diagram of an example process 300 for automated identification of malicious code. At 302, a detection and signature generation system, such as the detection and signature generation system 114, receives a plurality of script code samples. The plurality of script code samples are, in some embodiments, JavaScript® code samples although other types of script code samples may be used without departing from the scope of embodiments. The plurality of script code samples may be obtained by crawling the internet or other network, provided by another entity, or obtained in some other way. The script code samples include script codes of unknown status, e.g., it is unknown whether they are malicious or benign.

At 304, the detection and signature generation system divides the plurality of script code samples into partitions. In embodiments, the clustering steps are computationally intensive and may benefit from parallel execution on multiple devices. Partitioning the samples enables parallel clustering. The samples may be randomly partitioned or partitioned based on some criteria.

At 306, the detection and signature generation system produces a plurality of tokenized samples based on syntactical elements of the plurality of script code samples. For example, syntactical elements of the script code samples are identified and labeled. Keywords, Identifiers, Punctuation, String, syntactical elements are identified in the underlying code and token strings representing the script code are created. These syntactical elements are examples only, and other types of syntactical elements may be identified and labeled to produce the tokenized code samples. In some embodiments, at least some of the plurality of script code samples are obfuscated code samples, and the producing the plurality of tokenized samples is performed on the obfuscated code samples.

At 308, the detection and signature generation system, which may be spread across a plurality of devices in a parallel execution, identifies a cluster of samples based on similarities in different ones of the plurality of tokenized samples. The clustering of the tokenized samples may use one of various hierarchical clustering algorithms. In some embodiments, an edit distance—or the number of operations it would take to change one string to another string—is determined and used as a means of determining distance or similarity between any two code samples. In embodiments, a threshold edit distance is used sufficient to generate a reasonably small number of clusters while at the same time generating clusters that are sufficiently specific, and not likely to include code samples that are not malware. In one embodiment, a density-based algorithm is utilized to determine the clusters. Because the samples are partitioned across multiple machines for clustering, the clustering process also includes combining the clusters after parallel processing completed.

At 310, the detection and signature generation system selects a representative (e.g., a prototype) sample from each cluster. The representative sample may be randomly selected or selected based on its being most similar to the other samples in the cluster.

At 312, the detection and signature generation system de-obfuscates the representative sample. This is accomplished, in some embodiments, by executing unpacker code including for example custom de-obfuscation code, or using the unpacker components included in the script code samples 112 themselves. In embodiments, emulation of the code may be employed to unpack the code. In some embodiments, the unpacked payload of the exploit kit 104 is collected upon executing the exploit kit 104 in an execution engine.

At 314, the detection and signature generation system identifies known malicious code having a threshold similarity to a representative sample of the cluster of samples. This includes comparing the de-obfuscated representative sample to a plurality of known malicious code samples to identify the known malicious code sample having the threshold similarity to the representative sample. In some embodiments, a fingerprint of the de-obfuscated representative sample may be compared or matched to fingerprints of the known malicious code samples. In some embodiments, a winnowing histogram is used as the fingerprint. A winnowing histogram for the de-obfuscated representative sample is compared to winnowing histograms for the known malicious code samples.

At 316, the detection and signature generation system, based on the identifying the known malicious code sample within the threshold similarity to the representative sample, labels the cluster of samples as malicious. Once the cluster is labeled as malicious, the system may generate a signature to match the code samples in the cluster. Alternatively, the code samples labeled as malicious may be surfaced for human investigation, presented to another system for further machine analysis, or the labels may be used for some other purpose.

Figure 4:
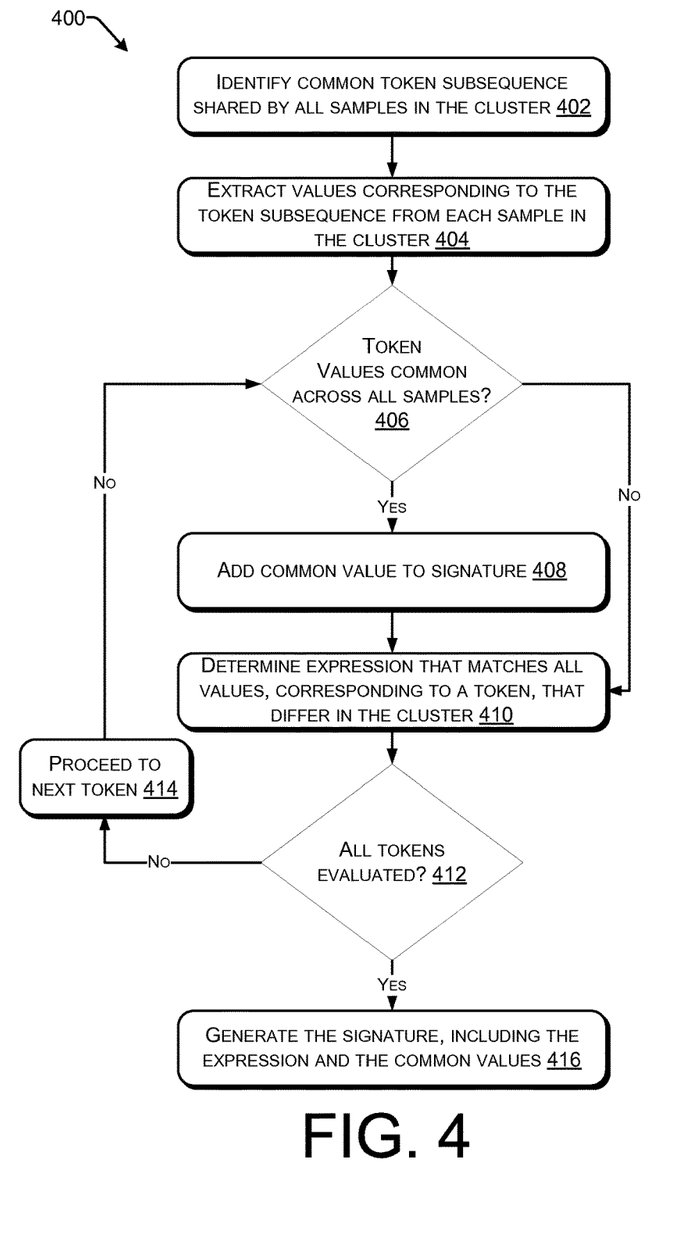
FIG. 4 illustrates depicts a flow diagram of an example process for signature generation.

FIG. 4 illustrates depicts a flow diagram of an example process 400 for signature generation, according to embodiments. At 402, a detection and signature generation system, such as the detection and signature generation system 114, identifies a common subsequence of tokens shared by ones of the plurality of tokenized samples that correspond to each of the code samples in the cluster of samples that is labeled malicious. The common subsequence may be constrained to be a certain number of tokens (for example 200 tokens or other length) and may be constrained to be at least another certain number of tokens (for example 20 tokens or other length). The common subsequence may be constrained to be unique amongst the samples in the cluster (e.g., the tokenized subsequence is the same, but the underlying concrete code may be constrained to be unique in each sample).

At 404, the detection and signature generation system extracts the values corresponding to the token subsequence from each sample in the cluster. The process then proceeds token-by-token to generate a signature element for each syntactical element in the subsequence. At 406, the detection and signature generation system determines whether values corresponding to a token in the subsequence are common across all samples in the cluster. If they are (the "YES" branch), then at 408 the values that are common across all samples are added to the signature.

If the values corresponding to a particular token are different (the "NO" branch), then at 410, expressions that match those values are created. At 408, the detection and signature generation system determines expressions that match all values, corresponding to a token, that differ within the cluster. The expressions may match all the values in the cluster, but are specific to the values found in the cluster. The expression is added to the signature.

At 412, the detection and signature generation system determines whether all tokens in the subsequence have been evaluated. If not (the "NO" branch), then at 414, the next token is selected and the process repeats. If all tokens have been evaluated (the "YES" branch), then at 416, the detection and signature generation system generates a generalized code signature usable to identify the script code samples in the cluster of samples, as described in more detail elsewhere within this Detailed Description.

In some embodiments, the signatures are provided to an anti-virus distribution system for distribution to end-user anti-virus or other malware protection software systems. In some embodiment, the signatures are provided to search engine back-end systems, which may use them to prevent links to websites with malware from appearing in search results shown to end users. The signatures may be provided to other entities or systems for other purposes.

Example Computing Device

Figure 5:
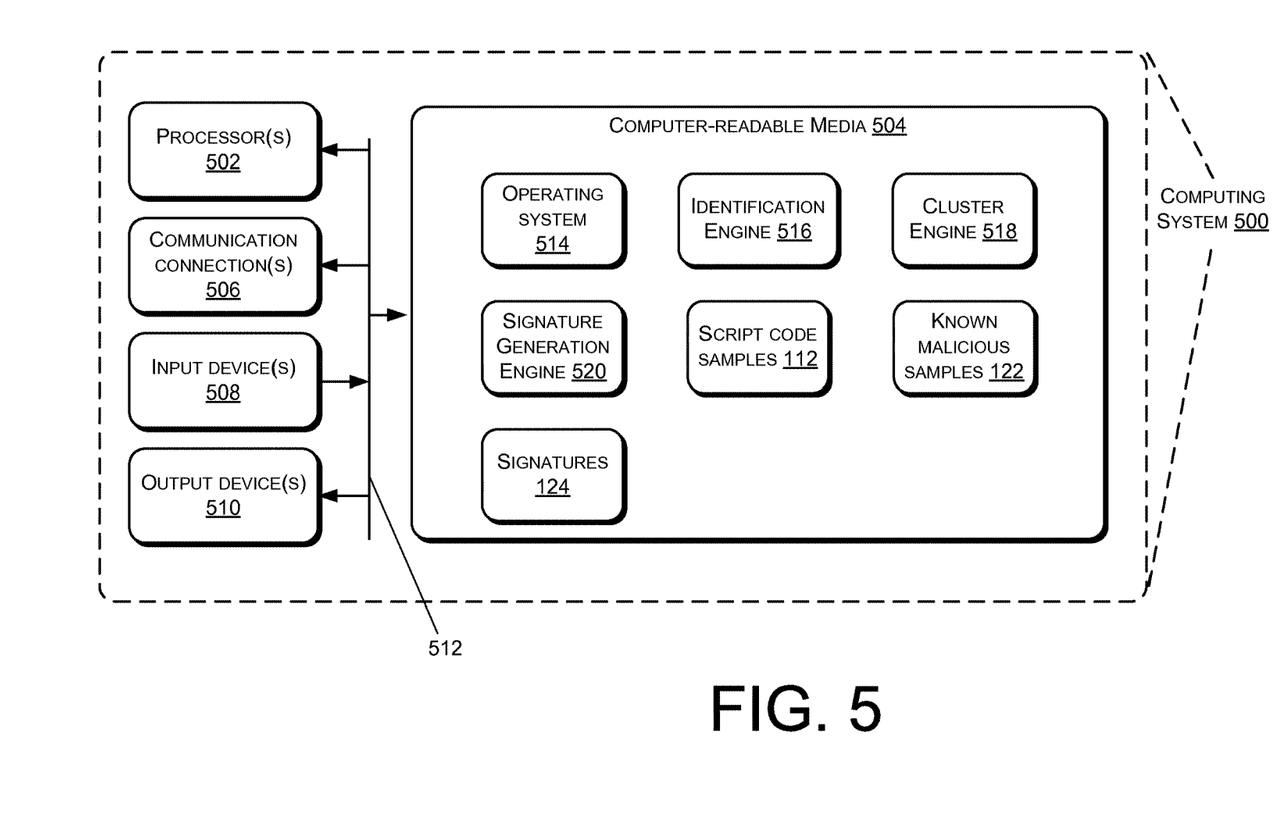
FIG. 5 is a block diagram of an example computing system usable to perform various methods as described herein

FIG. 5 is a block diagram of an example computing system 500 usable to perform various methods as described herein. According to various non-limiting examples, the computing system 500 includes one or more computing devices, such as desktop computers, servers, cloud-based servers, or other hardware devices. In one example configuration, the computing system 500 comprises at least one processor 502. The computing system 500 can also contain communication connection(s) 506 that allow communications with various other systems. The computing system 500 can also include one or more input devices 508, such as a keyboard, mouse, pen, voice input device, touch input device, etc., and one or more output devices 510, such as a display (including a touch-screen display), speakers, printer, etc. coupled communicatively to the processor(s) 502 and the computer-readable media 504 via bus 512.

The computer-readable media 504 stores computer-executable instructions that are loadable and executable on the processor(s) 502, as well as data generated during execution of, and/or usable in conjunction with, these programs. In the illustrated example, computer-readable media 504 stores an operating system 514, which provides basic system functionality of the computing system 500 and, among other things, provides for operation of the other programs and modules of the computing system 500.

The computer-readable media 504 includes an identification engine 516, a cluster engine 518, and a signature generation engine 520. The identification engine 516 may control the signature generation process, such as by receiving a plurality of script code samples, providing the samples to the cluster engine 518, receiving clusters of script code samples from the cluster engine 518, matching representative ones of the clusters of script code samples to known malicious code samples, and so forth.

The cluster engine 518 controls the parallelization of the clustering process, including partitioning the script code samples 112, providing the partitions to multiple devices for performing the clustering, receiving the clusters from the parallel machines, and combining the clusters into a final set of clusters. The cluster engine returns the clusters to the identification engine. The cluster engine 518 may also contain the clustering code, and may perform part or all of the parallel clustering execution, including the combining of clusters from multiple partitions, as described elsewhere within this Detailed Description.

The signature generation module 522 receives as input a labeled cluster and generates a generalized signature 124 usable to identify the script code samples in the cluster of samples, as described elsewhere within this Detailed Description.

Processor(s) 502 may be or include one or more single-core processing unit(s), multi-core processing unit(s), central processing units (CPUs), graphics processing units (GPUs), general-purpose graphics processing units (GPGPUs), or hardware logic components configured, e.g., via specialized programming from modules or application program interfaces (APIs), to perform functions described herein. In alternative embodiments one or more functions of the present disclosure may be performed or executed by, and without limitation, hardware logic components including Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processing unit(s) (DSPs), and other types of customizable processing unit(s). For example, a processing unit configured to perform one or more of the functions described herein may represent a hybrid device that includes a CPU core embedded in an FPGA fabric. These or other hardware logic components may operate independently or, in some instances, may be driven by a CPU. In some examples, embodiments of the computing system 500 may include a plurality of processing units of multiple types. For example, the processing units may be a combination of one or more GPGPUs and one or more FPGAs. Different processing units may have different execution models, e.g., as is the case for graphics processing units (GPUs) and central processing units (CPUs). In some examples, clustering may be performed using a first processing unit having an FPGA, ASIC, or DSP, and signature generation may be performed using a second processing unit having a CPU. This is an example only and other examples and combinations are possible without departing from the scope of embodiments.

Computer-Readable Media

Depending on the configuration and type of computing device used, computer-readable media 504 of the computing system 500 in FIG. 5 can include volatile memory (such as random access memory (RAM)) and/or non-volatile memory (such as read-only memory (ROM), flash memory, etc.). The computer-readable media 504 can also include additional removable storage and/or non-removable storage including, but not limited to, SSD (e.g., flash memory), HDD storage or other type of magnetic storage, optical storage, and/or tape storage that can provide non-volatile storage of computer-executable instructions, data structures, program modules, and other data for computing system 500.

Computer-readable media 504 can, for example, represent computer memory, which is a form of computer storage media. Computer-readable media includes at least two types of computer-readable media, namely computer storage media and communications media. Computer storage media includes volatile and non-volatile, removable and non-removable media implemented in any process or technology for storage of information such as computer-executable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other medium that can be used to store information for access and retrieval by a computing device. In contrast, communication media can embody computer-executable instructions, data structures, program modules, or other data in a modulated data signal, such as a carrier wave, or other transmission mechanism. As defined herein, computer storage media does not include communication media.

Example Clauses

Clause A: A computer-implemented method comprising receiving a plurality of script code samples; transforming the plurality of script code samples into a plurality of tokenized samples, the transforming based on syntactical elements of the plurality of script code samples; identifying a cluster of samples based on similarities in different ones of the plurality of tokenized samples; identifying known malicious code having a threshold similarity to a representative sample of the cluster of samples; based on the identifying, labeling the cluster of samples as malicious; and generating, based at least on respective ones of the plurality of tokenized samples associated with the cluster of samples, a generalized code signature usable to identify the script code samples in the cluster of samples.

Clause B: The computer-implemented method of clause A, wherein at least some of the plurality of script code samples are obfuscated code samples, and the tokenized samples are transformed from the obfuscated code samples.

Clause C: The computer-implemented method of either of clauses A or B, further comprising determining an edit distance between respective ones of the plurality of tokenized samples to determine the similarities in different ones of the plurality of tokenized samples.

Clause D: The computer-implemented method of any of clauses A-C, wherein the identifying the known malicious code includes at least de-obfuscating the representative sample of the cluster of samples to produce a de-obfuscated representative sample; and comparing the de-obfuscated representative sample to a plurality of known malicious code samples to identify the known malicious code sample having the threshold similarity to the representative sample.

Clause E: The computer-implemented method of clause D, wherein comparing the de-obfuscated representative sample to the plurality of known malicious code samples utilizes a winnowing technique.

Clause F: The computer-implemented method of any of clauses A-E, wherein the identifying the cluster of samples is performed using parallelization.

Clause G: The computer-implemented method of any of clauses A-F, wherein the generalized code signature matches all of the code samples in the cluster of samples.

Clause H: The computer-implemented method of any of clauses A-G, wherein the generating the generalized code signature includes identifying a common subsequence of tokens shared by ones of the plurality of tokenized samples that correspond to each of the code samples in the cluster of samples that is labeled malicious; generating an expression usable to match code portions from respective ones of the code samples in the cluster of samples, the code portions corresponding to the common subsequence of tokens; and including the expression in the generalized code signature.

Clause I: The computer-implemented method of any of clauses A-H, further comprising providing the generalized code signature to an anti-virus distribution system for distribution to one or more end user devices.

Clause J: The computer-implemented method of any of clauses A-I, wherein the plurality of code samples are JavaScript® code samples.

Clause K: A system, comprising one or more processors; memory; and one or more programming modules stored on the memory and executable by the one or more processors to: receive a plurality of code script samples; transform the plurality of code script samples into a plurality of tokenized samples, the transform based on syntactical elements of the plurality of code script samples; receive from a cluster engine identification of a cluster of samples based on similarities in different ones of the plurality of tokenized samples; identify a known sample of malicious code that has at least a threshold similarity to a representative sample of the cluster of samples; label the cluster of samples as malicious; and generate, based at least on ones of the plurality of tokenized samples corresponding to the plurality of code script samples in the cluster of samples, a generalized code signature usable to identify the script code samples in the cluster of samples.

Clause L: The system of clause K, wherein at least some of the plurality of script code samples are obfuscated code samples, and the one or more programming modules are further executable by the one or more processors to transform the obfuscated code samples into the tokenized samples.

Clause M: The system of either of clauses K or L, wherein the one or more programming modules are further executable by the one or more processors to implement the cluster engine, the cluster engine configured to determine an edit distance between ones of the plurality of tokenized samples to determine the similarities in different ones of the plurality of tokenized samples.

Clause N: The system of any of clauses K-M, wherein the one or more programming modules are further executable by the one or more processors to identify the known malicious code by at least: de-obfuscation of the representative sample of the cluster of samples to produce a de-obfuscated representative sample; and comparison of the de-obfuscated representative sample to a plurality of known malicious code samples to identify the known malicious code sample having the threshold similarity to the representative sample.

Clause O: The system of any of clauses K-N, wherein the comparison of the de-obfuscated representative sample to a plurality of known malicious code samples includes utilization of a winnowing technique on the de-obfuscated representative sample to the plurality of known malicious code samples.

Clause P: The system of any of clauses K-O, wherein the one or more programming modules are further executable by the one or more processors to: identify a common subsequence of tokens shared by ones of the plurality of tokenized samples corresponding to each of the code samples in the cluster of samples that is labeled malicious; generate an expression usable to match code portions from respective ones of the code samples in the cluster of samples, the code portions corresponding to the common subsequence of tokens; and include the expression in the generalized code signature.

Clause Q: A computer-implemented method of generating anti-virus signatures, the method comprising producing a plurality of tokenized samples, the plurality of tokenized samples including tokens that are based on syntactical elements of a plurality of script code samples; clustering at least some of the tokenized samples into a plurality of clusters; identifying known malicious code having a threshold similarity to a representative sample of a particular cluster of samples; and based on the identifying, generating an anti-virus signature that matches at least some of the script code samples in the particular cluster of samples, the generating based on a common subsequence of tokens found in ones of the plurality of tokenized samples corresponding to the particular cluster of samples.

Clause R: The computer-implemented method of clause Q, wherein one or more of the plurality of script code samples are obfuscated code samples, and the tokenized samples are produced from the obfuscated code samples.

Clause S: The computer-implemented method of either of clauses Q or R, wherein the identifying the known malicious code includes at least: de-obfuscating the representative sample of the cluster of samples to produce a de-obfuscated representative sample; and comparing the de-obfuscated representative sample to a plurality of known malicious code samples to identify the known malicious code sample having the threshold similarity to the representative sample.

Clause T: The computer-implemented method of any of clauses Q-S, wherein the generating the anti-virus signature includes: identifying the common subsequence of tokens shared by ones of the plurality of tokenized samples; generating an expression usable to match code portions from respective ones of the code samples in the cluster of samples, the code portions corresponding to the common subsequence of tokens; and including the expression in the anti-virus signature.

Clause U: A system, comprising means for receiving a plurality of code script samples; means for transforming the plurality of code script samples into a plurality of tokenized samples, the transform based on syntactical elements of the plurality of code script samples; receive from a cluster engine identification of a cluster of samples based on similarities in different ones of the plurality of tokenized samples; identify a known sample of malicious code that has at least a threshold similarity to a representative sample of the cluster of samples; label the cluster of samples as malicious; and generate, based at least on ones of the plurality of tokenized samples corresponding to the plurality of code script samples in the cluster of samples, a generalized code signature usable to identify the script code samples in the cluster of samples.

Clause V: The system of clause U, wherein at least some of the plurality of script code samples are obfuscated code samples, and the obfuscated code samples are transformed into the tokenized samples.

Clause W: The system of either of clauses U or V, further comprising the cluster engine, the cluster engine including means for determining an edit distance between ones of the plurality of tokenized samples to determine the similarities in different ones of the plurality of tokenized samples.

Clause X: The system of any of clauses U-W, further comprising means for identifying the known malicious code by at least: de-obfuscation of the representative sample of the cluster of samples to produce a de-obfuscated representative sample; and comparison of the de-obfuscated representative sample to a plurality of known malicious code samples to identify the known malicious code sample having the threshold similarity to the representative sample.

Clause Y: The system of any of clauses U-X, wherein the means for comparison of the de-obfuscated representative sample to a plurality of known malicious code samples utilizes of a winnowing technique on the de-obfuscated representative sample to the plurality of known malicious code samples.

Clause Z: The system of any of clauses U-Y, further comprising means for identifying a common subsequence of tokens shared by ones of the plurality of tokenized samples corresponding to each of the code samples in the cluster of samples that is labeled malicious; means for generating an expression usable to match code portions from respective ones of the code samples in the cluster of samples, the code portions corresponding to the common subsequence of tokens; and means for including the expression in the generalized code signature.

Clause AA: A computer-readable media including a plurality of programming instructions executable by one or more processors of a computing system to perform acts, comprising: receiving a plurality of script code samples; transforming the plurality of script code samples into a plurality of tokenized samples, the transforming based on syntactical elements of the plurality of script code samples; identifying a cluster of samples based on similarities in different ones of the plurality of tokenized samples; identifying known malicious code having a threshold similarity to a representative sample of the cluster of samples; based on the identifying, labeling the cluster of samples as malicious; and generating, based at least on respective ones of the plurality of tokenized samples associated with the cluster of samples, a generalized code signature usable to identify the script code samples in the cluster of samples.

Clause AB: The computer-readable media of clause AA, wherein at least some of the plurality of script code samples are obfuscated code samples, and the tokenized samples are transformed from the obfuscated code samples.

Clause AC: The computer-readable media of either of clauses AA or AB, wherein the acts further comprise determining an edit distance between respective ones of the plurality of tokenized samples to determine the similarities in different ones of the plurality of tokenized samples.

Clause AD: The computer-readable media of any of clauses AA-AC, wherein the identifying the known malicious code includes at least de-obfuscating the representative sample of the cluster of samples to produce a de-obfuscated representative sample; and comparing the de-obfuscated representative sample to a plurality of known malicious code samples to identify the known malicious code sample having the threshold similarity to the representative sample.

Clause AE: The computer-readable media of clause AD, wherein comparing the de-obfuscated representative sample to the plurality of known malicious code samples utilizes a winnowing technique.

Clause AF: The computer-readable media of any of clauses AA-AE, wherein the identifying the cluster of samples is performed using parallelization.

Clause AG: The computer-readable media of any of clauses AA-AF, wherein the generalized code signature matches all of the code samples in the cluster of samples.

Clause AH: The computer-readable media of any of clauses AA-AG, wherein the generating the generalized code signature includes identifying a common subsequence of tokens shared by ones of the plurality of tokenized samples that correspond to each of the code samples in the cluster of samples that is labeled malicious; generating an expression usable to match code portions from respective ones of the code samples in the cluster of samples, the code portions corresponding to the common subsequence of tokens; and including the expression in the generalized code signature.

Clause AI: The computer-readable media of any of clauses AA-AH, wherein the acts further comprise providing the generalized code signature to an anti-virus distribution system for distribution to one or more end user devices.

Clause AJ: The computer-readable media of any of clauses AA-AI, wherein the plurality of code samples are JavaScript® code samples.

Conclusion

Although the techniques have been described in language specific to structural features and/or methodological acts, it is to be understood that the appended claims are not necessarily limited to the features or acts described. Rather, the features and acts are described as example implementations.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method comprising:
receiving a plurality of script code samples;
transforming the plurality of script code samples into a plurality of tokenized samples, the transforming based on syntactical elements of the plurality of script code samples;
identifying one or more similarities between at least a first tokenized sample of the plurality of tokenized samples and a second tokenized sample of the plurality of tokenized samples;
based at least in part on the one or more similarities, identifying a cluster of samples including at least the first tokenized sample and the second tokenized sample;
selecting the first tokenized sample as a representative sample of the cluster of samples;
identifying known malicious code having a threshold similarity to the representative sample by de-obfuscating the representative sample of the cluster of samples to produce a de-obfuscated representative sample and comparing the de-obfuscated representative sample to a plurality of known malicious code samples;
based on the identified known malicious code, labeling each of the samples in the cluster of samples as malicious, wherein the label of each of the samples in the cluster of samples as malicious is unscored; and
generating, based at least on the unscored labeled samples in the cluster of samples, a generalized code signature, wherein the generalized code signature identifies the first tokenized sample and the second tokenized sample.

2. The computer-implemented method of claim 1, wherein at least some of the plurality of script code samples are obfuscated code samples, and the tokenized samples are transformed from the obfuscated code samples.

3. The computer-implemented method of claim 1, further comprising:
determining an edit distance between the first tokenized sample and the second tokenized sample to determine the one or more similarities in different ones of the plurality of tokenized samples.

4. The computer-implemented method of claim 1, wherein comparing the de-obfuscated representative sample to the plurality of known malicious code samples includes:
determining a winnow histogram for the de-obfuscated representative sample; and
comparing the determined winnow histogram to a corresponding plurality of winnow histograms for the plurality of known malicious code samples.

5. The computer-implemented method of claim 1, wherein the identifying the cluster of samples is performed using parallelization.

6. The computer-implemented method of claim 1, wherein the generalized code signature matches all of the code samples in the cluster of samples.

7. The computer-implemented method of claim 1, wherein the generating the generalized code signature includes:
identifying a common subsequence of tokens shared by ones of the plurality of tokenized samples that correspond to each of the code samples in the cluster of samples that is labeled malicious;
generating an expression usable to match code portions from respective ones of the code samples in the cluster of samples, the code portions corresponding to the common subsequence of tokens; and
including the expression in the generalized code signature.

8. The computer-implemented method of claim 1, further comprising providing the generalized code signature to an anti-virus distribution system for distribution to one or more end user devices.

9. The computer-implemented method of claim 1, further comprising:
determining a number of operations it would take to change one string to another string between respective ones of the plurality of tokenized samples to determine the one or more similarities in different ones of the plurality of tokenized samples.

10. The computer-implemented method of claim 1, wherein de-obfuscating the representative sample of the cluster of samples to produce a de-obfuscated representative sample includes:
de-obfuscating the representative sample of the cluster of samples using a custom de-obfuscation code to produce a de-obfuscated representative sample.

11. A system, comprising:
one or more processors;
memory; and
one or more programming modules stored on the memory and executable by the one or more processors to:
receive a plurality of code script samples;
transform the plurality of code script samples into a plurality of tokenized samples, the transform based on syntactical elements of the plurality of code script samples;
receive from a cluster engine identification of a cluster of samples, the cluster of samples including at least a first tokenized sample of the plurality of tokenized samples and a second tokenized sample of the plurality of tokenized samples, the cluster being identified at least in part based on similarities of the first tokenized sample and the second tokenized sample;
identify the first tokenized sample as a representative sample of the cluster of samples;
identify a known malicious code sample that has at least a threshold similarity to the representative sample by de-obfuscation of the representative sample of the cluster of samples to produce a de-obfuscated representative sample and comparison of the de-obfuscated representative sample to a plurality of known malicious code sample;

based on the identified known malicious code, label the cluster of samples as malicious, wherein the label of cluster of samples as malicious is unscored; and generate, based at least on the unscored labeled samples in the cluster of samples, a generalized code signature that identifies the first tokenized sample and the second tokenized sample.

12. The system of claim 11, wherein at least some of the plurality of script code samples are obfuscated code samples, and the one or more programming modules are further executable by the one or more processors to transform the obfuscated code samples into the tokenized samples.

13. The system of claim 11, wherein the one or more programming modules are further executable by the one or more processors to implement the cluster engine, the cluster engine configured to determine an edit distance between the first tokenized sample and the second tokenized sample to determine the one or more similarities in different ones of the plurality of tokenized samples.

14. The system of claim 11, wherein the comparison of the de-obfuscated representative sample to a plurality of known malicious code samples includes determination of a winnow histogram for the de-obfuscated representative sample; and comparison of the determined winnow histogram to a corresponding plurality of winnow histograms for the plurality of known malicious code samples.

15. The system of claim 11, wherein the one or more programming modules are further executable by the one or more processors to:

identify a common subsequence of tokens shared by ones of the plurality of tokenized samples corresponding to each of the code samples in the cluster of samples that is labeled malicious;

generate an expression usable to match code portions from respective ones of the code samples in the cluster of samples, the code portions corresponding to the common subsequence of tokens; and include the expression in the generalized code signature.

16. A computer-implemented method comprising:

producing a plurality of tokenized samples of script code by transforming a plurality of script code samples into the plurality of tokenized samples, the transforming based on syntactical elements of the plurality of script code samples;

identifying a cluster of tokenized samples from the plurality of tokenized samples, a first tokenized sample in the cluster of tokenized samples having at least one similarity with each additional tokenized sample in the cluster of tokenized samples;

selecting the first tokenized sample as a representative sample of the cluster;

comparing the representative sample to known malicious code;

based on the comparing, identifying known malicious code from among the code, the known malicious code having a threshold similarity to the representative sample by de-obfuscating the representative sample of the cluster of samples to produce a de-obfuscated representative sample and comparing the de-obfuscated representative sample to a plurality of known malicious code samples; and based on the identified known malicious code, labeling the cluster of tokenized samples as malicious, wherein the label of cluster of samples as malicious is unscored.

17. The computer-implemented method of claim 16, further comprising labeling each of the samples in the cluster as malicious code, wherein the label of each of the samples in the cluster of samples as malicious is unscored.

18. The computer-implemented method of claim 16, further comprising:

generating a generalized code signature based at least on the unscored labeled samples in the cluster of samples, wherein the generalized code signature identifies each tokenized sample in the cluster of tokenized samples.

19. The computer-implemented method of claim 16, wherein comparing the de-obfuscated representative sample to the plurality of known malicious code samples includes:

determining a winnow histogram for the de-obfuscated representative sample; and comparing the determined winnow histogram to a corresponding plurality of winnow histograms for the plurality of known malicious code samples.

20. The computer-implemented method of claim 16, wherein de-obfuscating the representative sample of the cluster of samples to produce a de-obfuscated representative sample includes:

de-obfuscating the representative sample of the cluster of samples using a custom de-obfuscation code to produce a de-obfuscated representative sample.

* * * * *